(12) United States Patent
Benza

(10) Patent No.: US 12,643,294 B2
(45) Date of Patent: Jun. 2, 2026

(54) METHOD OF CONTROLLING LOCAL ENVIRONMENT EXPOSURE DURING ADDITIVE MANUFACTURING

(71) Applicant: BATTELLE SAVANNAH RIVER ALLIANCE, LLC, Aiken, SC (US)

(72) Inventor: Donald W. Benza, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 90 days.

(21) Appl. No.: 18/653,186

(22) Filed: May 2, 2024

(65) Prior Publication Data

US 2024/0367387 A1 Nov. 7, 2024

Related U.S. Application Data

(60) Provisional application No. 63/500,097, filed on May 4, 2023.

(51) Int. Cl.

| | |
|---|---|
| *B29C 64/40* | (2017.01) |
| *B29C 64/106* | (2017.01) |
| *B29C 64/336* | (2017.01) |
| *B29C 64/371* | (2017.01) |
| *B33Y 10/00* | (2015.01) |
| *B33Y 70/00* | (2020.01) |

(52) U.S. Cl.
CPC ............ *B29C 64/40* (2017.08); *B29C 64/106* (2017.08); *B29C 64/336* (2017.08); *B29C 64/371* (2017.08); *B33Y 10/00* (2014.12); *B33Y 70/00* (2014.12)

(58) Field of Classification Search
CPC ..... B29C 64/40; B29C 64/106; B29C 64/336; B29C 64/371; B33Y 10/00; B33Y 70/00; B33Y 40/20
See application file for complete search history.

(56) References Cited

U.S. PATENT DOCUMENTS

| | | | |
|---|---|---|---|
| 9,423,756 B2 | 8/2016 | Hanson et al. | |
| 11,390,032 B2 | 7/2022 | Aramendia et al. | |
| 11,518,069 B2 | 12/2022 | Weiss et al. | |
| 2016/0175932 A1 | 6/2016 | Dimter et al. | |
| 2016/0375676 A1* | 12/2016 | Ritchie .................. | B22F 10/39 428/29 |

(Continued)

FOREIGN PATENT DOCUMENTS

| | | |
|---|---|---|
| CN | 112622264 A | 4/2021 |
| GB | 714514 | 9/1954 |

(Continued)

OTHER PUBLICATIONS

Chai et al., "Construction of 3D printed constructs based on microfluidic microgel for bone regeneration", Composites Part B, vol. 223, 2021, 12 pages.

*Primary Examiner* — Michael M. Robinson
(74) *Attorney, Agent, or Firm* — Dority & Manning, P.A.

(57) ABSTRACT

Described are additive manufacturing methods and systems that can deposit an occluding material in the form of a "cocoon" over previously deposited build material. The occluding material protects previously deposited layers from overexposure to the local environment and can allow exposure times of build material to be better controlled. The occluding material is removed following formation of the build product.

19 Claims, 7 Drawing Sheets

(56)        References Cited

U.S. PATENT DOCUMENTS

| | | | |
|---|---|---|---|
| 2017/0106594 A1* | 4/2017 | Gardiner ............... | B29C 64/124 |
| 2018/0229300 A1 | 8/2018 | Myerberg et al. | |
| 2019/0168301 A1* | 6/2019 | Bandiera ................. | B22F 12/53 |
| 2021/0237364 A1 | 8/2021 | Priedeman, Jr. | |
| 2021/0316498 A1 | 10/2021 | Kaplan et al. | |
| 2021/0362410 A1 | 11/2021 | Rudisill et al. | |
| 2021/0379836 A1* | 12/2021 | Fadurdo Orellana ... | B29C 64/40 |
| 2021/0387402 A1 | 12/2021 | Swanson et al. | |
| 2022/0001626 A1 | 1/2022 | Fornos Martinez et al. | |
| 2022/0304411 A1 | 9/2022 | Maddock et al. | |
| 2024/0025108 A1 | 1/2024 | Benza et al. | |

FOREIGN PATENT DOCUMENTS

| | | | |
|---|---|---|---|
| KR | 102033147 B1 | 10/2019 | |
| WO | WO 2020/153941 A1 | 7/2020 | |

* cited by examiner

METHOD OF CONTROLLING LOCAL ENVIRONMENT EXPOSURE DURING ADDITIVE MANUFACTURING

CROSS REFERENCE TO RELATED APPLICATION

This application claims filing benefit of U.S. Provisional Patent Application Ser. No. 63/500,097 having a filing date of May 4, 2023, which is incorporated herein by reference for all purposes.

FEDERAL RESEARCH STATEMENT

This invention was made with Government support under Contract No. 89303321CEM000080, awarded by the U.S. Department of Energy. The Government has certain rights in the invention.

BACKGROUND

Additive manufacturing is expected to one day have the capability to revolutionize manufacturing. Additive manufacturing technologies are distinguished from traditional formation processes by a layer-by-layer fabrication paradigm. This paradigm enables design flexibility and agility but often leads to significantly different final part properties compared to traditional bulk manufacturing methods formed of the same materials.

Traditional manufacturing techniques such as injection molding occlude materials from the local atmosphere as the material is shaped under pressure while at elevated temperatures. In additive manufacturing, such isolation is not the case as the layer-wise paradigm exposes the entirety of the part to the local atmosphere during manufacture. The contact of the build material with the local atmosphere during the entirety of the manufacturing process, which can be several hours, can introduce negative effects to the build material due to reactions with atmospheric components, drafts, humidity, dust, etc., which can lead to poor part performance and quality control issues. For instance, chemical changes to a build material via exposure to reactive gases such as ozone during manufacture can be induced layer by layer to affect part performance characteristics. While such reactions can be designed to instigate a positive result in the build product, excessive contact to the reactive gases throughout the entirety of the build process can cause portions of the build product to exhibit undesirable characteristics due to excessive reaction. For instance, exposure of polycarbonate to ozone during an additive manufacturing procedure can lead to a color gradient in the final part, due to the earlier deposited layers experiencing excessive chemical reactions with the ozone of the local atmosphere as compared to the later-deposited build material.

The deposition of a secondary material in an additive manufacturing process is not unknown. For instance, and as illustrated in FIG. 1, it is known for 3D printers to print supports 20 for a build material 22 that is not directly attached to the build plate 24. This is generally done to maintain geometric stability of the build material 22 after deposition. The materials used for the supports 20 may be a material that is deposited through a single deposition apparatus that is also used for deposition of the build material or can be a material that is deposited from a secondary deposition apparatus.

What is needed in the art are methods for protecting deposited extrudate from the local atmosphere during a build. Such methods could be beneficial in ensuring part quality after deposition.

SUMMARY

According to one embodiment, disclosed is an additive manufacturing method that includes depositing a first polymeric build material to form a first portion of a build product. The method can also include depositing a polymeric occlusion material on a surface of the portion of the build product such that the surface and the occlusion material are in contact with one another. The method also includes depositing a second polymeric build material to form a second portion of the build product. At a later time, following deposition of the second polymeric build material, the occlusion material can be removed from the surface. Thus, the occlusion material can protect the surface upon which it is deposited from the local atmosphere during a portion of the additive manufacturing process.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Figure 1:
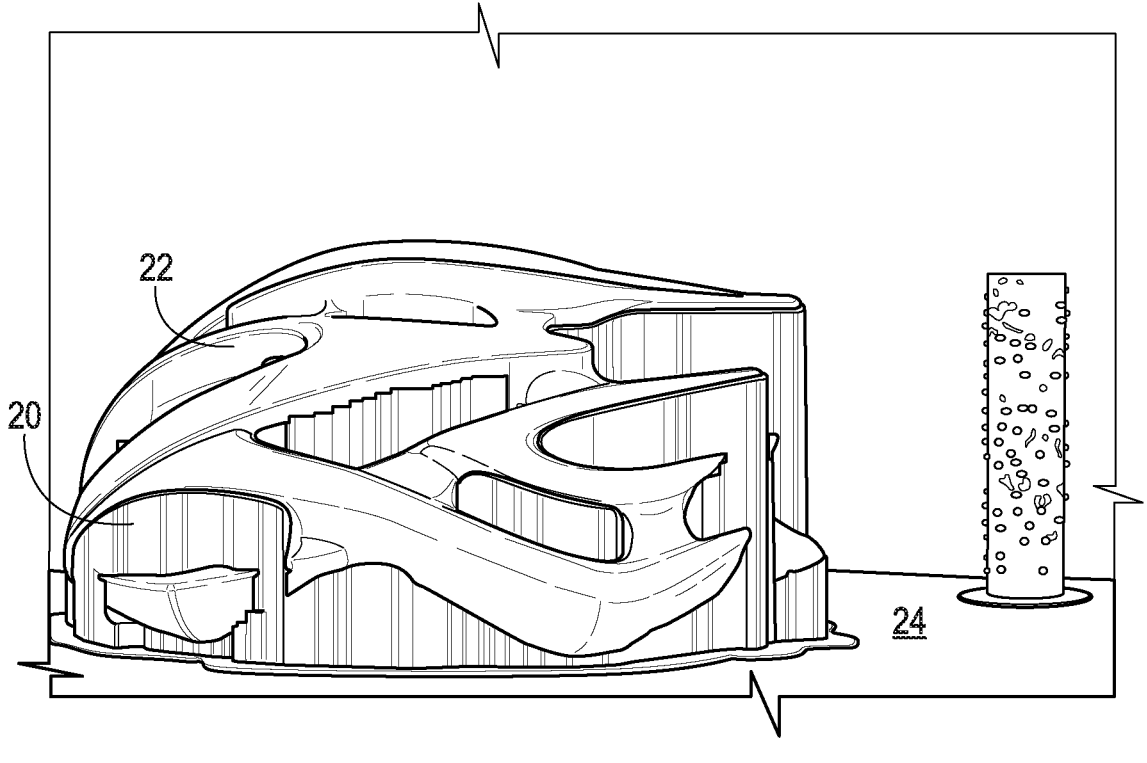
FIG. 1 illustrates a prior art formation process in which a build material is deposited upon a support structure.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to additive manufacturing methods and systems that can overcome existing problems in the art by printing an occluding material in the form of a "cocoon" to cover and protect previously printed material. The printed occluding material can protect previously deposited layers from overexposure to the local environment, can allow for modification of later deposited materials without affecting the previously deposited and protected material, and can allow exposure times of a build material to be better controlled.

During additive manufacturing, the local atmosphere can include components such as reactive gases, UV light, moisture, air currents, or the like, that can affect some aspect of the deposited material, including, without limitation, surface chemistry, surface structure, bulk chemistry, etc. of deposited layers. These changes may be inconsequential or even beneficial when present or initiated during certain stages of the printing process. Unfortunately, however, excessive contact can become detrimental to deposited material. As such, control of contact between the local environment and the build material over the course of a deposition can be used to control the presence or density of reactions as a function of exposure time. For instance, additive manufacturing of polymers in an atmosphere containing reactive gases may allow for chemical manipulations of deposited material that are not possible or difficult in traditional manufacturing. These chemical manipulations may lead to part property improvement such as increased interlayer bonding. The beneficial manipulations may be best performed when the deposited material is in a particular state. Typical print times may be extensive, up to several days, and initially printed layers may become overexposed to a reactive atmosphere over an extensive time, particular when considering deposited polymers in the solid state. As such, control of exposure of a build material to environmental conditions during deposition, such as contact with a reactive gas species, may provide a route to better control the characteristics of a finished product.

The disclosed methods and systems provide for the formation of a protective cocoon directly deposited on previously deposited build material such that the occluding material of the cocoon and the build material are in intimate contact with one another. The formation of this protective covering can occlude the previously deposited material from the local environment and control exposure of the deposited build material to one or more conditions of the local environment during the remaining build process. Through deposition of an occluding material and formation of a protective layer or cocoon over previously deposited and exposed build material, disclosed methods can control the exposure of the build material to one or more components of the local environment during a build, and distinct areas of a build product can experience a controlled amount of exposure to the local environment, which can increase part quality consistency.

Additive manufacturing methods encompassed herein include those that can deposit a polymeric material (e.g., a polymeric melt, solution, or dispersion) to produce layers followed by spontaneous or controlled curing of the deposited material upon deposition, with each successive layer becoming adhered to the previous layer during the cure/solidification process. In general, any layer-by-layer additive manufacturing process can be utilized in conjunction with disclosed methods and systems for formation of a manufactured part. Additive manufacturing processes encompassed herein can differ from one another with regard to the composition of the build material(s) used to form individual layers. Exemplary manufacturing processes encompassed can include, without limitation, fused filament fabrication (FFF), fused deposition modeling (FDM), or any other layer-by-layer 3D printing (3DP) methodology.

Figure 2:
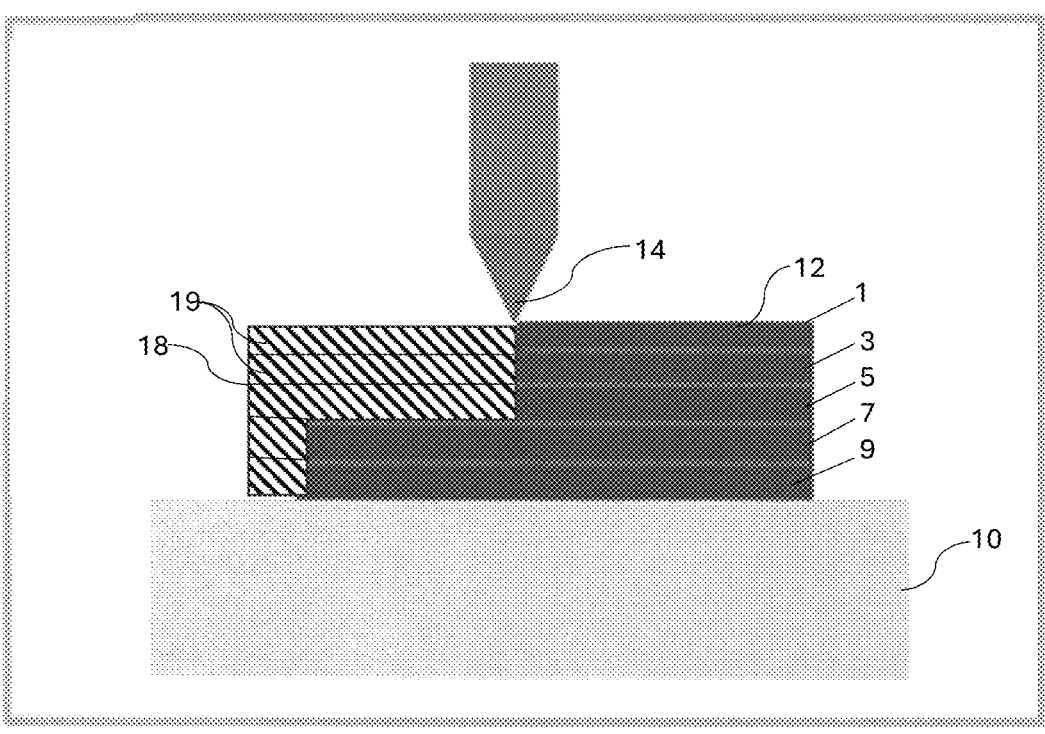
FIG. 2 illustrates one embodiment of a method as disclosed herein.

As illustrated in FIG. 2, in one embodiment, a polymeric build material 12 can be deposited from a nozzle 14 to a print bed 10. The polymeric build material can be in the form of a gel, melt, solution, dispersion, or the like that can be extruded in a plurality of layers 1, 3, 5, 7, 9. By way of example, a polymer melt can be deposited via extrusion as a first layer 9 in a desired pattern and the extrudate can then be cured through, e.g., a change in temperature (e.g., spontaneously upon deposition) or via active instigation (e.g., a UV or otherwise actively initiated curing mechanism) of the entire layer or only select portions of the layer. Following or prior to full cure of the first layer 9, another layer 7 of the extrudate can be applied, and so on through additional layers 5, 3, 1 to build an entire 3D structure.

The individual layers of a build need not be fully cured or solidified prior to deposition of an additional layer to the previous layer. For instance, full cure of a build may not be complete until well after the deposition of all layers of a build. Similarly, partial cure can take place of each successive layer during the build, and no particular cure rate of a deposition material is required in disclosed methods.

There is no particular limitation to a build material 12 as can be utilized in disclosed methods. In one embodiment, a build material 12 can be a polymeric composition, e.g., a melt, solution, gel, or suspension that includes at least one polymer or pre-polymer (e.g., oligomers and/or monomers) that can form a matrix polymer of a continuous polymeric matrix of a build product. For instance, following deposition, an oligomer and/or monomers of a composition can polymerize to form a matrix polymer of a build material. As utilized herein, the term "matrix polymer" generally refers to a polymer that forms a continuous phase of a structure, as opposed to a interspersed or discontinuous phase (e.g., fillers, particulates, etc.). Additional polymers of a build material 12 can include additional matrix polymers as well as non-matrix polymers, e.g., polymers present in the composition in the form of particulate additives, discontinuous fibrous fillers, etc.

Matrix polymers as may be included in a polymeric composition build material are not particularly limited and can include, without limitation, thermoplastic or thermoset polymers such as polyolefins (e.g., high density polyethylene (HDPE), polypropylene), polystyrenes, polyurethanes, polyethylene terephthalates (PET), acrylonitrile butadiene styrenes (ABS), glycolyzed polyesters (PETG), polycarbonates (PC), polyamides (e.g., nylon), polyetherketones (e.g., PEEK, PEKK, polyaryletherketones, polyetherimides), biodegradable polymers (e.g., polylactide (PLA)), polyphenylsulfones (e.g., PPSU, PPSF), halogenated polymers (e.g., PTFE, PVC), elastomeric thermoplastics, etc., as well as any combinations thereof.

A build material 12 can optionally include components in addition to one or more polymers such as, for instance, a solvent, a viscosity modifier, a surface tension modifier, a particulate or fibrous additive, a catalyst, a compatibilizer, etc.

A solvent can be an aqueous solvent or an organic solvent. In some embodiments, an aqueous solvent can be utilized, while in others, a binary solvent system or an organic solvent may be selected. Typical solvents can include, without limitation, water, ethanol, dichloromethane, acetone, furfuryl alcohol, dimethyl formamide, formic acid, acetic acid, tetrahydrofuran, and mixtures thereof. When present, a solvent can generally be included in a polymer composition in an amount of from about 0.1 wt. % to about 10 wt. % (e.g., about 0.1 wt. % to about 5 wt. %).

Examples of suitable viscosity modifiers include (and are not limited to) glycols (e.g., ethylene glycol, propylene glycol), ethers (e.g., ethylene glycol methyl ether), alcohols (e.g., 1-propanol), esters (ethyl lactate), ketones (e.g., methyl ethyl ketone (MEK)) and organo-sulphur compounds (e.g., sulfolane). When present, a viscosity modifier can be included in a polymer composition in an amount of from about 0.1 wt. % to about 50 wt. % (e.g., about 0.1 wt. % to about 5 wt. %).

A surface tension modifier is suitably a water-soluble surface-active material that can, in one embodiment, be advantageous as a processing aid. Examples of suitable materials include surfactants, generally non-ionic surfactants such as (and without limitation to) Triton®, Tween®, poloxamers, cetostearyl alcohol, cetyl alcohol, cocamide DEA, monolaurin, Nonidet® P-40, nonoxynols, decyl glucoside, pentaethylene glycol monododecyl ether, lauryl glucoside, oleyl alcohol, and polysorbate. When present, a surface tension modifier can be in the polymer composition at an amount of from about 0.01 wt. % to about 2 wt. %.

In some embodiments, a build material 12 can include a particulate or fibrous additive, for instance, a carbon or inorganic additive (e.g., graphene, carbon nanotubes, metals, ceramic, glass fibers, etc.) or polymeric particulate additive, for instance, in the formation of a printable ink. Additives can include those formed of a polymer blend or a polymer alloy and can generally be formed of a polymer that differs from a polymer of a build product polymer matrix. By way of example, in one embodiment, a polymeric additive can include an elastomeric polymer, e.g., as an impact modifier.

In some embodiments, the build material 12 can include a dispersant or compatibilizer that can encourage dispersion of components in the composition, e.g., encourage dispersion and compatibilization of a particulate within a polymeric matrix and/or dispersion of two polymers within one another. A dispersant can include, in one embodiment, a polycyclic aromatic compound. For instance, a dispersant can include a ring system that includes from 2 to 10 fused benzene rings, the ring system being substituted with from 1 to 4 independently selected hydrophilic groups, each hydrophilic group including less than 20 atoms that may be independently selected from S, O, P, H, C, N, B and I. Exemplary hydrophilic groups include $SO_3H$, $SO_2H$, $B(OH)_2$, $CO_2H$, OH and $PO^3H$. Generally, when the polyaromatic compound comprises multiple substituent groups, they are not all the same. The polycyclic aromatic compound may be a salt, e.g., a base addition salt. Common compatibilizer compounds include organosilanes having the general formula $R_1$—Si—$(R_2)_3$ in which $R_1$ is a sulfide group, e.g., an alkyl sulfide, an alkenyl sulfide, optionally containing an amino group, and $R_2$ is an alkoxy group. When present, the amount of a dispersant/compatibilizer present in an ink can be from about $10^{-4}$ mol/L to about $200×10^{-4}$ mol/L.

Upon deposition of an amount of a build material 12, e.g., one or more layers of the build material 12 in a desired pattern, an occlusion material 19 can be deposited such that it contacts and covers all or a portion of the previously deposited build material 12. Deposition of an occlusion material 19 can form an occlusion structure 18 that contacts the surface of all or a portion of the build material 12 deposited up to that point in the formation process. Accordingly, the occlusion structure 18 can maintain intimate contact with at least that portion of the build material 12 upon which it is deposited. By way of example, an occlusion structure 18 can contact a surface of a previously deposited build material of a surface area of about 2 cm² or greater, such as about 5 cm² or greater or about 10.

In one embodiment, the occlusion structure 18 will not have further build material 12 deposited thereon during subsequent layer formation of the build. This is not a requirement, however, and in some embodiments, additional build material can be deposited on the occlusion material 19, e.g., a portion of the occlusion structure 18.

By formation of the occlusion structure 18, the build material 12 covered thereby will not be exposed to the local atmosphere until removal of the occlusion structure 18. The occlusion structure 18 can protect the underlying build material 12 independent of the location of the build material 12, e.g., whether or not said build material 12 is supported by the build plate 10, previous layers that may or may not have a portion thereof in contact with the occlusion structure 18, a secondary build structure, etc.

The occlusion material 19 may be deposited in any suitable form, e.g., melt, solution, gel, dispersion, etc. The occlusion material may be thermoplastic or thermosetting in nature. Materials for use in forming the occluding structure 18 can include materials that can be removed later, following completion of the build, without damage to the underlying build material 12. In one embodiment, an occlusion material 19 can include polymeric materials that can be dissolved by use of a solvent such as water, acetone, etc.

In those embodiments in which the local environment can include a reactive gas, an occlusion material 19 may be selected that exhibits little or no reactivity with the gas at hand, however, as the occlusion material 19 is configured to be removed at a later time, it is not necessary that the occlusion material 19 is completely unaffected by the local environment. For instance, use of an occlusion material 19 that may exhibit an amount of oxidation in the presence of oxygen or some other oxidizing agent as may be present in the surrounding atmosphere is encompassed, as long the effect on the occlusion material 19 is not such that the protection of the underlying build material 12 by the occlusion structure 18 is not affected. By way of example, the occlusion material 19 can be a polymeric composition that can remain impermeable though not necessarily entirely unaffected in the presence of reactive components or electromagnetic radiation of the local environment during a build process. Thereby, the occlusion structure 18 can protect the underlying build material under deposition conditions even in those embodiments in which the occlusion structure 18 itself may exhibit an effect to the deposition conditions.

In one embodiment, the occlusion structure 18 can encapsulate and contact the entire exterior skin of a build part, for instance when a first build part formed by a first build material 12 is retained in a potentially detrimental atmosphere during a secondary formation process. By way of example, an occlusion structure 18 may be used to control thermal characteristics of all or a portion of a previously deposited build material 12, and as such, may in one embodiment be deposited so as to cover the entire exterior skin of a previously deposited build material 12. Similarly, an occlusion structure may be used to prevent interaction of a first component formed of a first build material with some aspect of the local environment during the formation of a second component formed of a second build material that is attached to or otherwise engaged with the first component.

In one embodiment, the occlusion material 19 can be soluble in a chemical solution that does not affect the build material 12. As such, the occlusion structure 18 can be dissolved and removed without negatively affecting the build material 12. One example of an occlusion material 19 is a polymeric composition comprising a polyvinyl alcohol, which is dissolvable by water. Utilization of water as a solvent for an occlusion material 19 can be beneficial in some embodiments as water will not negatively affect many other polymers, i.e., polymers for use as a build material 12. Another example of an occlusion material 19 is a composition comprising a high impact polystyrene, which can be dissolved with acetone, which can have no effect on many possible build polymers, e.g., poly-lactic acid. A polymeric composition for use as an occlusion material 19 can include a matrix polymer in conjunction with one or more additives, examples of which have been described above in reference to a build material.

Figure 3:
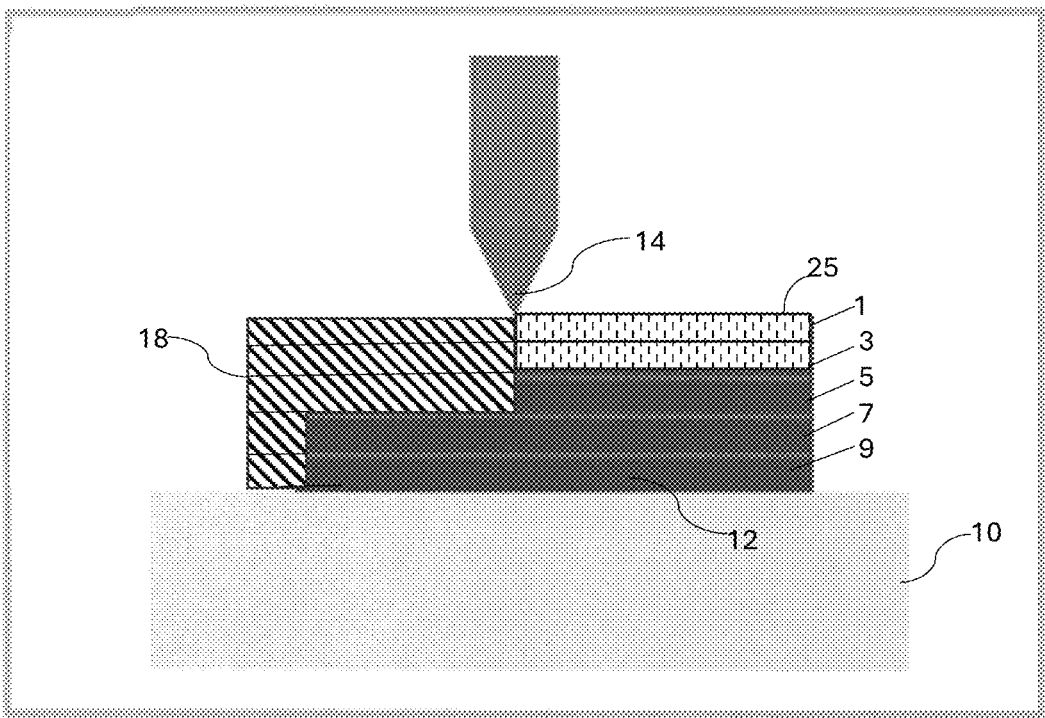
FIG. 3 illustrates another embodiment of a method as disclosed herein including deposition of multiple different build materials.

Disclosed methods are not limited to a single build material 12 and/or a single occlusion material 19. For instance, in one embodiment as illustrated in FIG. 3, a process can include deposition of a first build material 12 followed by deposition of a second build material 25. An occlusion structure 18 can be deposited so as to contact and protect a portion of the first build material 12 as well as a portion of the second build material 25. In some embodiments, the occlusion structure 18 may contact or cocoon all or only a portion of the first build material 12 or all or only a portion of the second build material 25.

Figure 4:
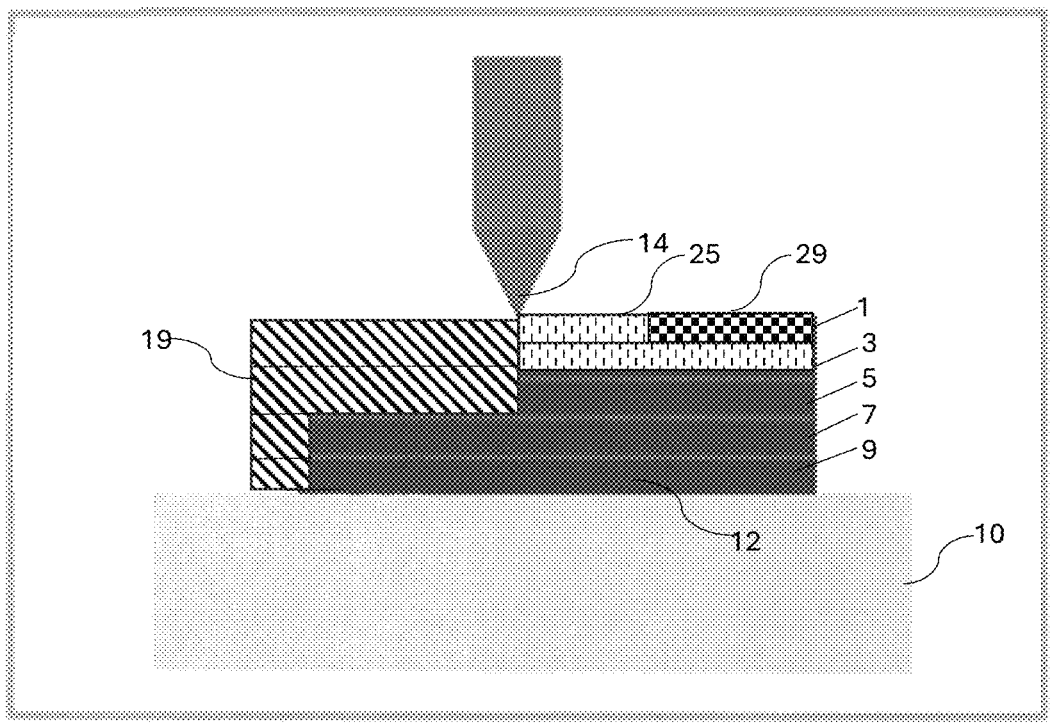
FIG. 4 illustrates another embodiment of a method as disclosed herein including deposition of multiple different build materials and multiple different occlusion materials.

In yet another embodiment as illustrated in FIG. 4 all or a portion of a first build material 12 can be protected by a first occlusion material 19, and a different occlusion material 29 can be deposited to protect all or a portion of a second build material 25. Through combinations of multiple build materials and/or occlusion materials, highly controlled deposition characteristics can be attained for complicated structures.

When combining multiple different build materials or different occlusion materials in a single structure, the build/occlusion materials can differ from one another with regard to one or more components. For instance, different materials can include completely different components or can include one or more components in common. By way of example, a first build material can include a first matrix polymer and a second build material can include a second, different matrix polymer, optionally in conjunction with the first matrix polymer. In another example, different build or occlusion materials can include the same components but can differ with regard to relative proportions of the components. In yet another example, different build or occlusion materials can differ with regard to a non-polymeric component, e.g., a first material includes a first matrix polymer, and a second material includes a non-polymeric component that exhibits reactivity to the first matrix polymer (e.g., a crosslinking agent, a functional monomeric reactant, etc.), optionally in conjunction with the first matrix polymer, a second, different polymer or no additional polymeric component.

The timing of deposition between deposition of a build material 12 and an occlusion material 19 is not critical, and can vary depending upon the specific nature of the materials and the characteristics of the local environment, as well as the desired physical characteristics of the final product. For instance, in one embodiment as illustrated in FIG. 2-FIG. 4, a system can include a single deposition head 14 via which both the build material(s) and the occlusion material(s) can be deposited. In such an embodiment, there may be an interval between deposition of the initial build material 12 and the deposition of the occlusion material 19 to contact at least a portion of the build material 12, as it will be necessary to modify the deposition head 14.

Figure 5:
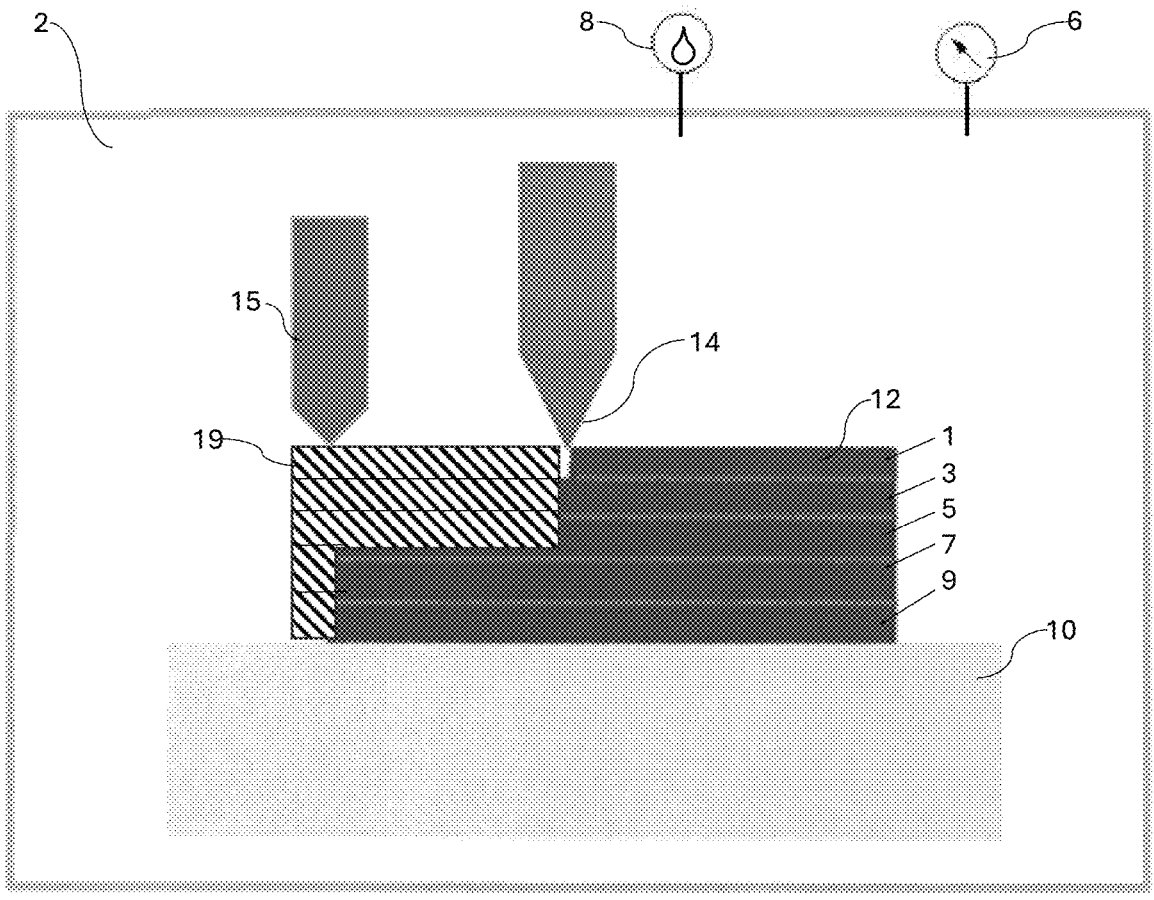
FIG. 5 illustrates another embodiment of a method as disclosed herein including utilization of multiple deposition heads.

In other embodiments, a system can include multiple deposition nozzles. For instance, and as illustrated in FIG. 5, in one embodiment a build material 12 can be deposited from a first deposition head 14 and an occlusion material 19 can be deposited from a second deposition head 15. Such an embodiment can be preferred, for instance, if it is desirable to protect a portion of the build material 12 with the occlusion material 19 in a more timely fashion than would be possible when using a single deposition head for both. Of course, a system is not limited to one or two deposition heads and multiple deposition heads can be utilized for the same or different materials.

A system can also include a control system for controlling parameters of a formation process including, and without limitation to, temperature within a deposition area (e.g., within an environmentally controlled chamber 2), temperature of the print bed 10, temperature of the nozzle(s) 14, 15, flow characteristics of a build material 12 and an occlusion material 19, pressure (as represented by gauge 6) within the chamber 2, and optionally, humidity (as represented by gauge 8) within the chamber.

Deposition of any material is not limited to any particular vertical layer thickness. For example, the thickness of an individual layer of a build material 12 can be the same or different as compared to the thickness of an occlusion material 19. Similarly, individual layers of a single material can be the same of different from one another. Additionally, when forming an occlusion structure 18, the structure 18 can utilize a single layer thickness of the occlusion material 19 in covering at least a portion of the build material 12 or can include multiple layers of the occlusion material 18 in covering at least a portion of the build material 12. For instance, protection of the build material may be achieved by multi-layer over-deposition of an occlusion material 19 on a build part, which could also be utilized to eliminate/mitigate discontinuities in a protected structure. The thickness of the occlusion material 19 of an occlusion structure 18 may be as thin as the width of the deposition apparatus, for instance a heated nozzle that deposits a polymer in a single layer thickness of about 10 mm or more in some embodiments.

Figure 6:
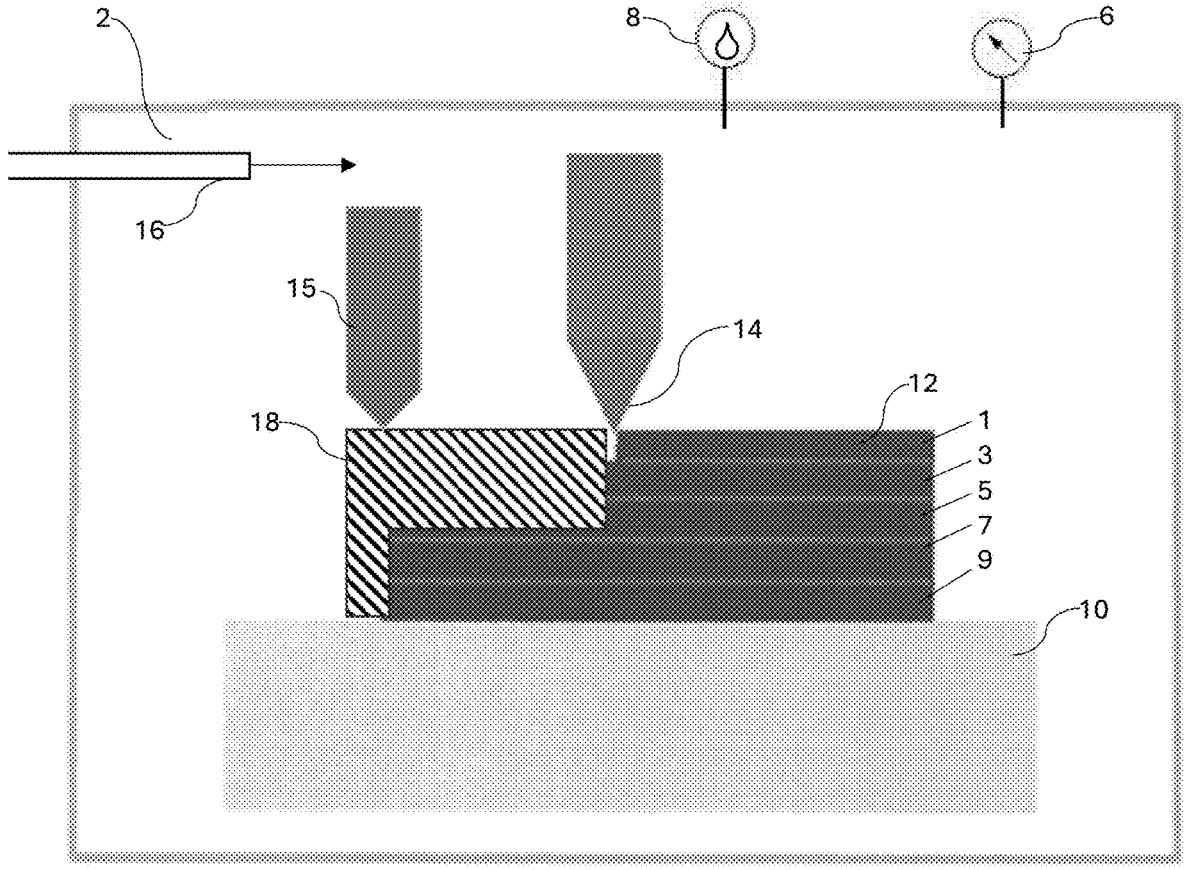
FIG. 6 illustrates another embodiment of a method as disclosed herein including addition of a gaseous reactant to the local environment during a formation process.

In one embodiment, a system can be designed to deliver one or more reactive agents to the formation environment. For instance, and as illustrated in FIG. 6, in one embodiment, a system can be designed to deliver one or more chemical reactive agents via an inlet 16 to the local deposition environment, e.g., a deposition chamber 2 that can be separated from the surrounding environment, such as by a positive pressure within the chamber 2. A deposition chamber 2 can be sealable from the surrounding environment, in some embodiments. However, this is not a requirement of a system and in other embodiments, a deposition chamber 2 need not be hermetically sealed from the surrounding atmosphere during use.

The introduction of one or more reactive agents can allow for reactions between the agent and a polymer of the build material 12 or other components of the environment (e.g., other components of the build material) which can result in controlled and deliberate chemical modifications of a component of the build material leading to property changes in the composition of the build material and/or the resulting product.

Inlet 16 can be utilized to deliver a reactive agent in the form of a gaseous or vaporous flow into the chamber 2. A reactive gas as may be delivered to a deposition chamber 2 via an inlet 16 can include a reactant selected for reaction with a polymer or another component of the build material 12 so as to cause a chemical modification to the polymer.

Exemplary gas phase reactants can include, without limitation, ozone, ammonia, nitrogen, hydrogen, sulfur dioxide, phosphine, chlorine, fluorine, acyl chloride, carbon disulfide, and ethylene gas, as well as combinations of chemical reactants.

A reactive agent as may be utilized to modify or control a build material 12 is not limited to a chemical reactive agent as may be delivered in the form of a gaseous or vaporous flow via an inlet 16. In another embodiment, a reactive agent to be delivered to a build material 12 can include electromagnetic energy. When incorporated in a system as a reactive agent, electromagnetic energy can excite one or more components of the build material, a chemical reactive agent, or both to create a more energetically favorable situation for reactions to occur in/on the build material. The introduction of energy as a reactive agent can assist in overcoming energy threshold barriers which can allow new reactions to occur and/or increase the rate of reactions that would eventually occur absent the introduction of the energy.

Figure 7:
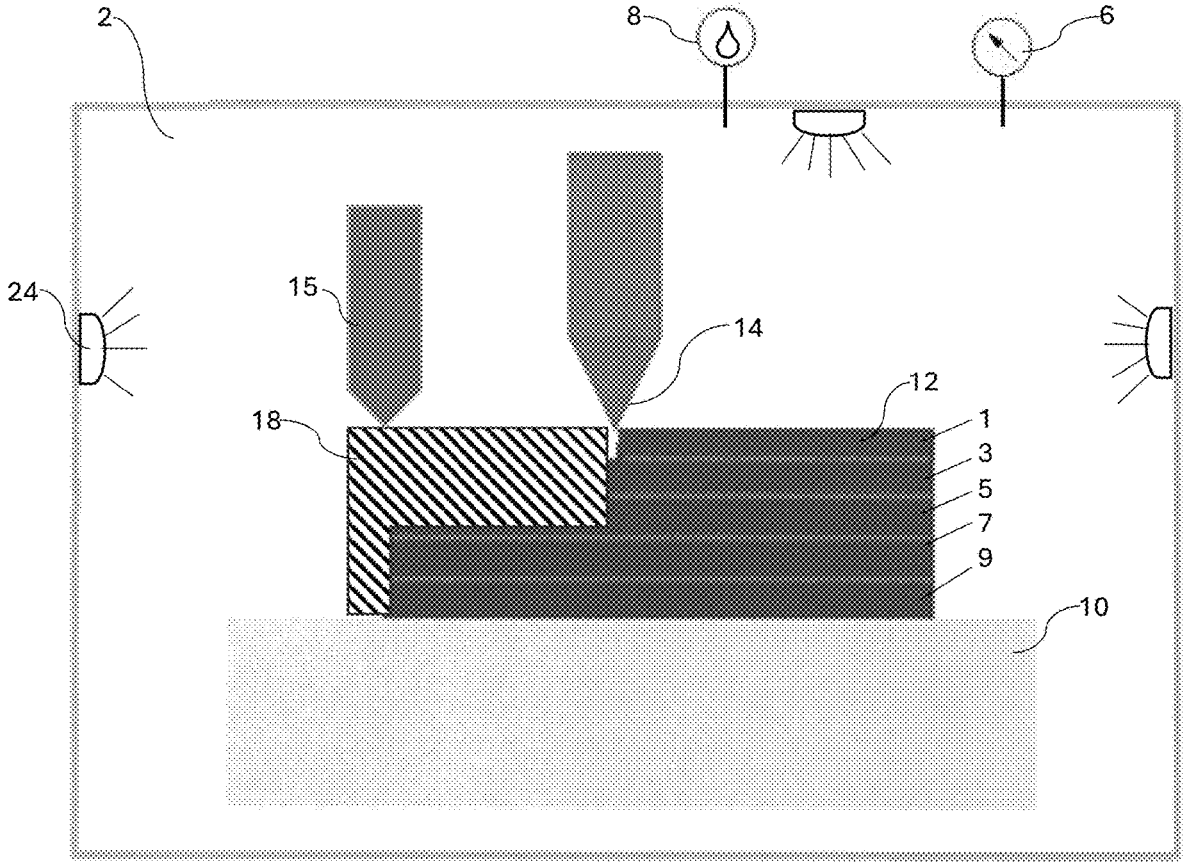
FIG. 7 illustrates another embodiment of a method as disclosed herein including addition of diffuse energy to the local environment during a formation process.
Figure 8:
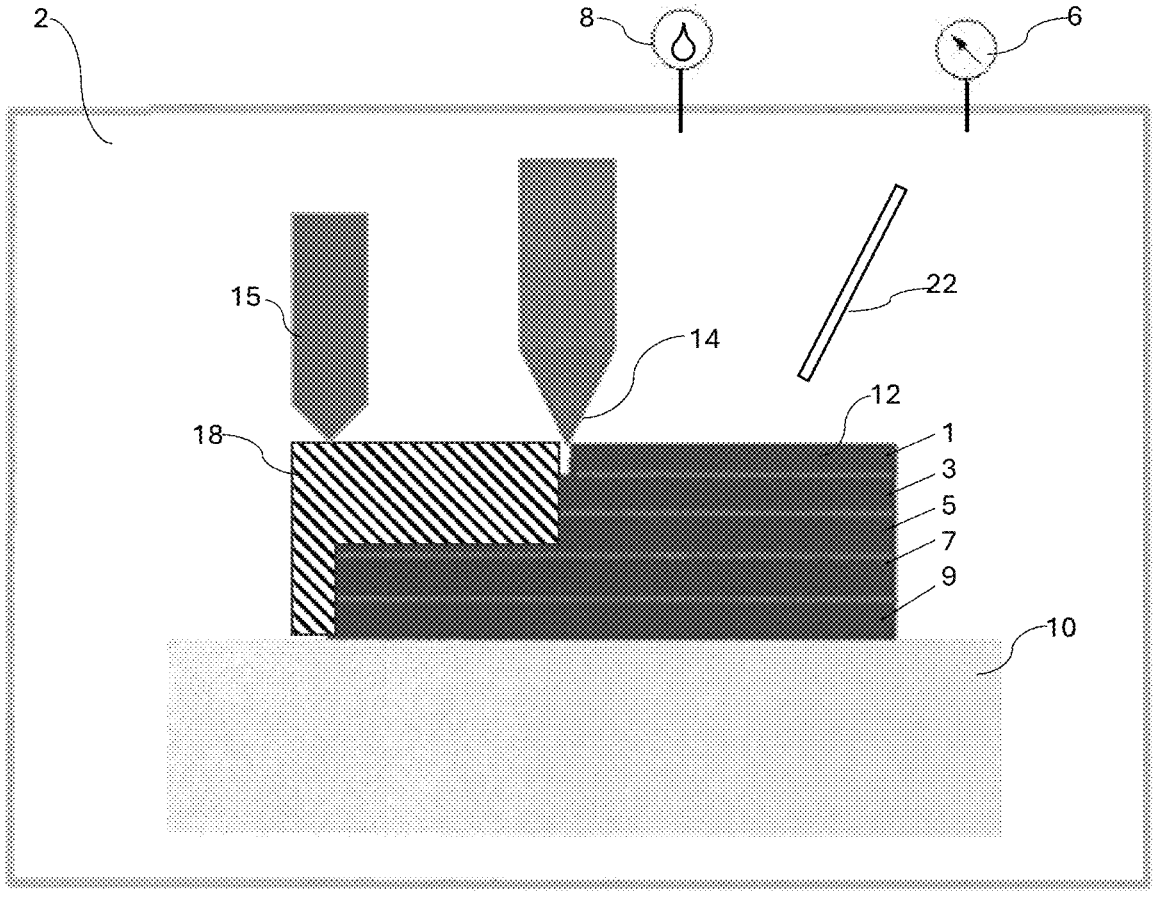
FIG. 8 illustrates another embodiment of a method as disclosed herein including addition of directed energy to a build material during a formation process.

In one embodiment, an example of which is illustrated in FIG. 7, a system can include one or more devices 24 for diffuse delivery of electromagnetic energy, e.g., energy in the ultraviolet (UV) or infrared (IR) wavelength spectra. In another embodiment, an example of which is illustrated in FIG. 8, a system can include one or more focused energy devices 22 for directed delivery of electromagnetic energy. For instance, a system can include a focused energy device 22 such as an electron gun, an x-ray emitter, a microwave emitter, a magnetic induction system, or a laser for delivery of a focused beam of electromagnetic energy. In one embodiment, a focused energy device 22 can deliver a focused beam at or near (e.g., within about 1 inch) of the opening of the nozzle 14 and/or the deposition point of the build material.

In some embodiments, a system can include a combination of one or more focused energy device 22 and one or more diffuse energy devices 24.

Electromagnetic energy delivered to a build material 12 can include electromagnetic energy at only a single wavelength or can include a spectrum of wavelengths, as desired. For instance, in the case of a focused beam delivery device 22, electromagnetic energy to be delivered can be of a single wavelength, while in the case of a diffuse delivery device 24, the energy to be delivered can be a broader spectrum. Energy to be delivered as a reactive agent can be within any desired spectrum, including, without limitation, the microwave, infrared, visible, ultraviolet or x-ray spectrum, such as from about 1 m to about 10 pm, such as from about 1 mm to about 1 m (e.g., in the microwave spectrum), such as from about 1 mm to about 1 cm (e.g., an extremely high microwave frequency), such as from about 1 cm to about 100 cm (e.g., a super high microwave frequency), such as from about 100 cm to about 1 m (e.g., an ultra-high microwave frequency), such as from about 1 μm to about 1 cm (e.g., in the infrared spectrum), such as from about 1 μm to about 10 μm (e.g., a near infrared frequency), such as from about 10 μm to about 100 μm (e.g., a mid-infrared frequency, such as from about 100 μm to about 1 mm (e.g., a far infrared frequency), such as frum about 100 nm to about 1 μm (e.g., a near ultraviolet through visible frequency), such as from about 1 nm to about 100 nm (e.g., an extreme ultraviolet frequency), such as from about 10 μm to about 1 nm (e.g., an x-ray frequency).

Any combination of reactive agents can be provided, including one or more chemical reactive agents optionally combined with one or more types of electromagnetic energy. However, in some embodiments, a system can deliver only chemical reactive agent(s) or only electromagnetic energy as the reactive agent. For example, a first period of deposition of a build material can be carried out in conjunction with delivery of a first reactive agent, e.g., a gaseous reactive agent, and following, that portion of the build (or a portion thereof) can be protected by deposition of an occlusion material. Following, a second build material (which can be the same or different from the first build material) can be deposited in conjunction with delivery of a second reactive agent. The second reactive agent can be the same or different from the first reactive agent and/or can include multiple reactive agents, one or more of which differ from the first reactive agent.

The reactive agent(s) can modify a matrix polymer or another component of a build material 12. In some embodiments, the modification can include modification of one or more functional groups along a polymer backbone and/or chemical modifications of pendant groups that extend from a matrix polymer backbone through reaction of a matrix polymer with a chemical reactive agent. Chemical modifications can include, and without limitation to, formation of hydroxyl, peroxide, hydroperoxide, aldehyde, carboxyl, amines, amides, halogenated, and methoxy groups on a component of the build material. For instance, a carbonyl group can be modified to form a carboxyl group, an ester group can be modified to form a peroxide group, a methyl group can be modified to form a methanol, etc.

Chemical modifications can include formation or destruction of bonds, which can be covalent or non-covalent in nature. For instance, in one embodiment, chemical bonds/associations can be formed that are non-covalent but fit the category of hydrogen bonds or Van der Waals associations. In such an embodiment, a modification to the build material can include the formation of a "supra-molecular complex" in the build material, i.e., a complex of a plurality of build material molecules held together through non-covalent interactions.

Chemical modification of a polymer can include bond formation between a polymer and a chemical reactive agent and/or another component of a build material. For instance, a polymer can be crosslinked upon interaction with a reactive agent. In such embodiments, a polymer can crosslink with itself and/or with another component of a build material, such as another polymer and/or a particulate of the build material. Crosslinking can be carried through addition of energy to the system alone or, alternatively, through addition of a chemical reactive agent, e.g., a crosslinking agent, optionally, in conjunction with the addition of energy as a secondary reactive agent. In one embodiment, contact with a reactive agent can lead to formation of a radical on the polymer chain which can then encourage reaction of the polymer with itself (e.g., crosslink formation) and/or with another component of the build material.

Chemical modification of a polymer can also include bond breakage. For instance, a reaction product can destabilize a polymer through formation of a destabilizing chemical group on the polymer, through formation of a radical on the polymer, etc., leading to bond breakage either along the polymer backbone or on a pendant group of the polymer.

A resulting product can thus include both the modified and unmodified polymer(s), as well as one or more interaction products of the compounds within the depth of the layer that exhibits the chemical modification.

A chemical modification of a build material can alter one or more characteristics of a build material so as to provide benefit during the manufacturing process, to the final build product, or both. For instance, modifications to a build material due to a chemical modification to a polymer contained therein can include, without limitation, changes in surface energy, dispersion domain size, interfacial strength, small molecule transport selectivity, macroscopic scale optical appearance (e.g., color, fluorescence, etc.), scent, etc.

Following deposition of a build material, all or a portion of the build part can be occluded in one or more occlusion structure(s) formed of one or more occlusion materials. The occlusion material(s) may be applied following a desired contact period between the build material and the surrounding atmosphere. The occlusion material(s) may be removed at any point following manufacture. For instance the occlusion structure(s) may be used as protection of the underlying build material following the build process, such as for protection during storage. In one embodiment, the occlusion material can be utilized to protect the underlying build material during storage and shipping and removed following shipping of a part to a location of intended use.

An occlusion structure 18 can be removed through mechanical or chemical destruction. For instance, an occlusion structure 18 can be ground off or peeled away from an underlying build material 12. In one embodiment, an occlusion material 18 may be removed thermally by melting or thermal decomposition. In yet another embodiment, an occlusion material 18 can be dissolved by use of a suitable solvent, e.g., water or acetone, and thereby to expose the underlying build material.

While certain embodiments of the disclosed subject matter have been described using specific terms, such description is for illustrative purposes only, and it is to be understood that changes and variations may be made without departing from the spirit or scope of the subject matter.

What is claimed is:

1. An additive manufacturing method comprising:
depositing a first polymeric build material to form a first portion of a build product;
depositing a polymeric occlusion material on a surface of the first portion of the build product such that the surface and the polymeric occlusion material are in contact with one another, the polymeric occlusion material being a continuous polymeric matrix that forms a barrier between the first polymeric build material and a reactive agent;
depositing a second polymeric build material to form a second portion of the build product; and
following deposition of the second polymeric build material, removing the polymeric occlusion material from the surface.

2. The method of claim 1, further comprising contacting the first polymeric build material with the reactive agent, the contact occurring prior to the deposition of the polymeric occlusion material.

3. The method of claim 2, wherein the reactive agent is contacted with the first polymeric build material in the form of a reactive gas or reactive vapor.

4. The method of claim 2, the reactive agent comprising electromagnetic energy.

5. The method of claim 4, wherein the electromagnetic energy is delivered to the first polymeric build material from a delivery device as a diffuse electromagnetic energy.

6. The method of claim 4, wherein the electromagnetic energy is delivered to the first polymeric build material from a delivery device as a focused electromagnetic energy.

7. The method of claim 2, wherein the reactive agent is contacted with the first polymeric build material in the form of a reactive gas or reactive vapor, and the polymeric occlusion material is impermeable to the reactive gas or reactive vapor.

8. The method of claim 1, wherein the polymeric occlusion material comprises a melt, a solution, a gel, or a dispersion.

9. The method of claim 1, wherein the polymeric occlusion material comprises a polyvinyl alcohol or a high impact polystyrene.

10. The method of claim 1, wherein the step of removing the polymeric occlusion material comprises dissolving the polymeric occlusion material with a solvent.

11. The method of claim 10, wherein the solvent comprises water or acetone.

12. The method of claim 1, the removal of the polymeric occlusion material comprising mechanical removal.

13. The method of claim 1, wherein the first polymeric build material and the second polymeric build material are the same.

14. The method of claim 1, wherein the first polymeric build material and the second polymeric build material are different.

15. The method of claim 1, the first polymeric build material comprising a polymeric melt, a solution, a gel, or a dispersion.

16. The method of claim 1, the second polymeric build material comprising a polymeric melt, a solution, a gel, or a dispersion.

17. The method of claim 1, the first polymeric build material and/or the second polymeric build material comprising an oligomer or a monomer that polymerizes following deposition thereof.

18. The method of claim 1, the first polymeric build material and/or the second polymeric build material independently comprising a polyolefin, a polystyrene, a polyurethane, a polyethylene terephthalate, an acrylonitrile butadiene styrene, a glycolyzed polyester, a polycarbonate, a polyamide, a polyetherketone, a biodegradable polymer, a polyphenylsulfone, a halogenated polymer, an elastomeric thermoplastic, or any combination thereof.

19. The method of claim 1, wherein the polymeric occlusion material is impermeable to the reactive agent.

* * * * *